United States Patent
Garcia et al.

(10) Patent No.: US 7,161,491 B2
(45) Date of Patent: Jan. 9, 2007

(54) METHOD AND APPARATUS FOR WET CONTACT DETECTION IN A PORTABLE COMMUNICATION DEVICE

(75) Inventors: Jorge L. Garcia, Plantation, FL (US); Richard A. Lauterberg, Margate, FL (US); Shuyong Shao, Boca Raton, FL (US)

(73) Assignee: Motorola, Inc., Schaumburg, IL (US)

( * ) Notice: Subject to any disclaimer, the term of this patent is extended or adjusted under 35 U.S.C. 154(b) by 342 days.

(21) Appl. No.: 10/938,216

(22) Filed: Sep. 10, 2004

(65) Prior Publication Data
US 2006/0058069 A1 Mar. 16, 2006

(51) Int. Cl.
*G08B 21/00* (2006.01)
*H04B 1/38* (2006.01)

(52) U.S. Cl. ..................... 340/604; 455/90.1

(58) Field of Classification Search ........... 340/604, 340/539.1–539.28; 455/557, 575.1, 90.1–90.3; 324/538, 537, 691, 761
See application file for complete search history.

(56) References Cited

U.S. PATENT DOCUMENTS

| 6,980,777 | B1* | 12/2005 | Shepherd et al. | 455/90.3 |
| 7,050,837 | B1* | 5/2006 | Menz et al. | 455/572 |
| 2005/0208969 | A1* | 9/2005 | Kwoen | 455/557 |

* cited by examiner

*Primary Examiner*—Daniel Wu
*Assistant Examiner*—Jennifer Mehmood
(74) *Attorney, Agent, or Firm*—Barbara R. Doutre

(57) ABSTRACT

A method of detecting wetness in an accessory jack of a portable communication device (100), such as a two-way radio, is provided. By monitoring an accessory jack detect pin of the radio (104) for a change in resistance (106) that falls within predetermined parameters, a determination can be made (108) as to whether the accessory jack contacts are wet or dry. An alert is provided to a user (110) of the portable communication device that the accessory jack contacts need to be dried.

12 Claims, 2 Drawing Sheets

METHOD AND APPARATUS FOR WET CONTACT DETECTION IN A PORTABLE COMMUNICATION DEVICE

TECHNICAL FIELD

This invention relates in general to portable communication devices and more particularly to wet contact detection for such devices.

BACKGROUND

Portable communication devices, such as two-way radios and cell phones, are used in variety of environments. Cell phones typically address the needs of the consumer market while two-way radios are most often used in the public safety arena, such a police and fire rescue. There is an ever increasing need to have these two types of communication systems overlap in terms of interoperability. Accessories which can be used interchangeably between the two types of products are highly desirable so that the overall number of accessories carried by a user can be minimized. The ability to use off the shelf cell phone accessories with a two-way radio however, presents challenges for the two-way radio designer.

Two-way radios tend to be more rugged than cell phones in terms of their design for water intrusion. Water sealing is a required feature for most two-way radios and is typically accomplished through the use of a mechanical seal or cover. While the seal can prevent water intrusion into the body of the two-way radio, there remains the possibility of water intrusion into the jack while the jack's cover is removed. A wet contact area can lead to galvanic contacts and possibly degrade or make inoperable the accessory performance. If water intrusion could be detected by the two-way radio, the user could be warned to dry the contacts.

Accordingly, there is a need for a method and apparatus for detecting water intrusion in an accessory jack of a portable communication device.

BRIEF DESCRIPTION OF THE DRAWINGS

The features of the present invention, which are believed to be novel, are set forth with particularity in the appended claims. The invention, together with further objects and advantages thereof, may best be understood by reference to the following description, taken in conjunction with the accompanying drawings, in the several figures of which like reference numerals identify like elements, and in which:

DETAILED DESCRIPTION OF THE PREFERRED EMBODIMENT

Figure 1:
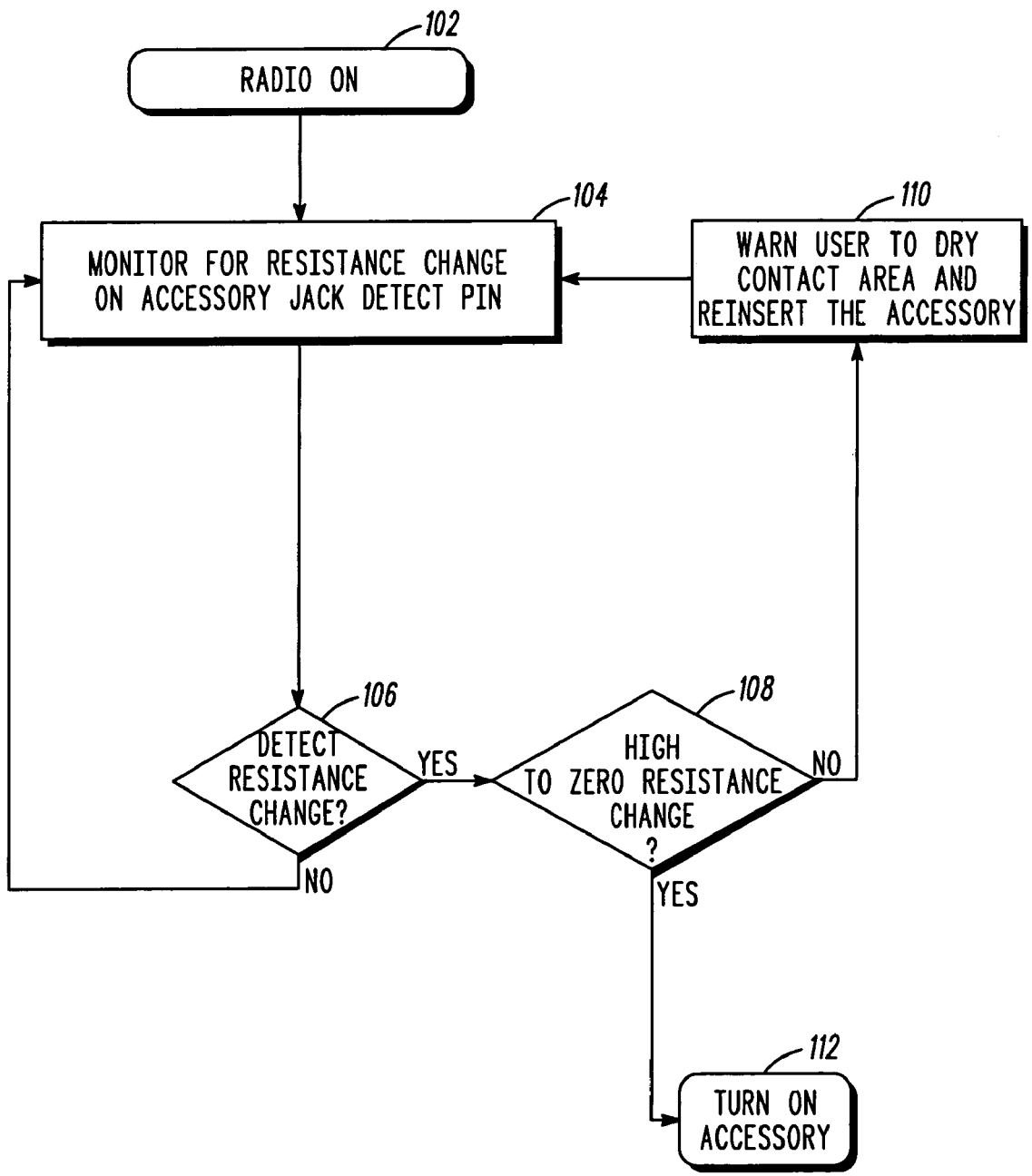
FIG. 1 is method detecting wet contacts in a portable communication device in accordance with the present invention.

While the specification concludes with claims defining the features of the invention that are regarded as novel, it is believed that the invention will be better understood from a consideration of the following description in conjunction with the drawing figures, in which like reference numerals are carried forward.

In accordance with the present invention, there is provided herein a method and apparatus for detecting water intrusion at the accessory jack of a portable communication device. The wetness detection technique and apparatus of the present invention utilizes an existing accessory detect pin to detect wetness at the contacts as well as insertion of an accessory into the jack. Upon detection of wet contacts, the portable communication device warns the user that the contacts should be dried prior to insertion of an accessory. Additionally, the portable communication device can disable operation of an accessory if inserted into the jack.

FIG. 1 is a method of detecting wetness in an accessory jack, such as an audio jack, of portable communication device, preferably a two-way radio, in accordance with the present invention. Method 100 begins by turning the radio on at step 102 and monitoring a resistance at the accessory jack detect pin at step 104. In accordance with the present invention, if a change in resistance is detected at step 106 a determination is made at step 108 as to whether the change in resistance was either a high to low resistance change or some other resistance level therebetween. If the resistance level falls within a predetermined range between the high and the low, then water intrusion has been detected and the radio warns the user at step 110 to dry the contact area prior to insertion of an accessory. If the user does not heed the warning, the radio can disable accessory operation upon insertion of an accessory into the jack. The warning alert can take on a variety of forms, visual, audio or combination thereof.

The user can be alerted to wet contacts prior to any accessory insertion by simply monitoring the resistance value at the detect pin. Alternatively, it may be desirable to only have the radio alert the user to the wet contacts when he or she attempts to insert the accessory into the jack. Either of these options can be programmed into the radio.

Once the contacts are dry, the resistance level returns to normal. Then, when an accessory is inserted into the accessory jack, the radio will detect an appropriate resistance change, such as a high to low resistance change, which enables the radio to turn on the accessory at step 112. Thus, the accessory is not enabled until an appropriate change in resistance is detected by the radio.

Figure 2:
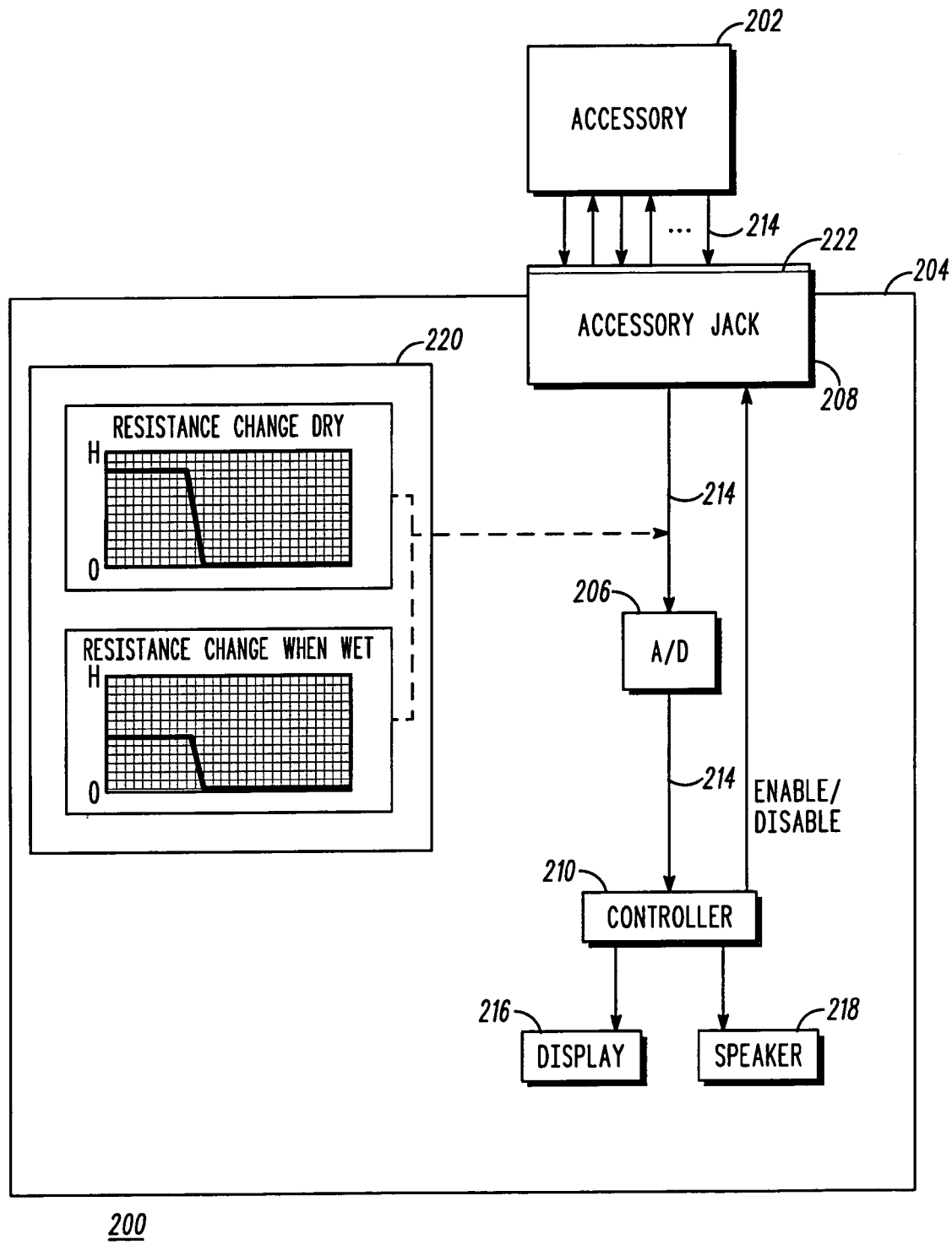
FIG. 2 is a partial block diagram of accessory jack wet contact detection circuit in accordance with a preferred embodiment of the invention.

FIG. 2 is a partial block diagram of an accessory jack wet contact detection circuit 200 in accordance with a preferred embodiment of the invention. The wetness detection circuit 200 of the present invention includes accessory 202 coupled to two-way radio 204 through audio accessory jack 208, the audio accessory jack having an accessory insertion detect pin 214 coupled to a controller 210 through an analog-to-digital (A/D) converter 206. In accordance with the preferred embodiment, the audio accessory detect pin 214 is utilized to detect the presence and absence of the accessory 202 as well as the detection of wet contacts 222 at the accessory 208.

Graphical representations 220 show the change in contact resistance under wet and dry conditions. The analog voltage entering A/D 206 gets converted into a digital signal. Variations in the voltage level correspond to variations in the resistance of the contacts 222 of accessory jack 208. The controller 210 monitors the output of the A/D converter 206 the A/D converter providing a predetermined digital value corresponding to the insertion and removal of the accessory under dry conditions (i.e. max to mim value upon insertion or vice versa) and the A/D converter providing an intennediate value level to indicate the presence of a wet condition. The change in digital values corresponds to a change in resistance at the accessory detect pin 214.

Upon reading a resistance value that is not open or closed (high or low), the radio 204 alerts the user that the contacts 222 of accessory jack 208 need to be dried. As mentioned previously, the alert may be visual, such as through a radio display 216, or audible such as a tone through a speaker 218, or some combination thereof. The alert can be sent periodically prior to any accessory insertion into the jack 202 or alternatively the alert can be sent only upon insertion of the accessory into the jack 202. The controller 210 will disable operation of the accessory 202 until an appropriate change in resistance is detected at detect pin 214. Thus, the accessory jack wet contact detection circuitry 200 of the preferred embodiment utilizes the existing accessory detect pin 214 in conjunction with A/D 206 for contact wetness detection as well as insertion detection. Voltage levels at the contacts 222 of the accessory jack 208 are preferably maintained at a minimal level to prevent galvanic corrosion.

While the preferred embodiment has been described using an analog-to-digital converter, one skilled in the art can utilize comparators and predetermined thresholds to achieve similar results. While primarily intended to facilitate the use of off the shelf cell phone accessories to be used in conjunction with two-way radios, other portable communication devices, such as cell phones, personal digital assistants ands the like can also benefit from the method and apparatus for wet contact detection of the present invention.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method detecting wetness in an accessory jack of a portable communication device, comprising:
    monitoring a resistance at an accessory jack detect pin of the portable communication device;
    determining whether the resistance falls within a predetermined range associated with wet contacts; and
    providing an alert to a user that the contacts need to be dried.

2. A method of detecting wetness in an accessory jack of a two-way radio, comprising:
    monitoring a resistance at an accessory jack detect pin of the radio;
inserting an accessory into the accessory jack;
    detecting a change in resistance;
    determining whether the change in resistance is a high to low (low to high) change or a resistance therebetween; and
    providing an alert to a user that the accessory needs to be removed and that the contacts need to be dried in response to the resistance falling therebetween.

3. The method of claim 2, further comprising the steps of:
removing the accessory;
drying the contacts;
reinserting the accessory into the accessory jack; and
detecting a resistance change of high to low at the detect pin; and turning on the accessory.

4. An apparatus for detecting wet contacts in a portable communication device, comprising:
    an accessory jack for receiving an accessory, the accessory jack having an accessory detect pin;
    an analog to digital (A/D) converter coupled to the accessory detect pin; and
    a controller for monitoring the A/D converter, the A/D converter providing a predetermined change in value in response to the insertion and removal of the accessory under dry conditions, and the A/D converter providing a different change in value to indicate the presence of a wet condition.

5. A communication device, including an accessory jack having an accessory detect pin, the accessory detect pin being utilized to detect the presence and absence of an accessory as well as the detection of wet contacts when the accessory is connected.

6. The communication device of claim 5, wherein the communication device provides an alert to indicate the detection of wet contacts to a user.

7. The communication device of claim 6, wherein the alert is a visual alert.

8. The communication device of claim 6, wherein the alert is an audible alert.

9. The communication device of claim 5, wherein the communication device is a portable two-way radio.

10. The communication device of claim 5, wherein the communication device is a cell phone.

11. The communication device of claim 5, wherein the accessory jack is an audio jack.

12. The communication device of claim 5, wherein the presence and absence of an accessory as well as the detection of wet contacts is determined by a resistance change of the accessory detect pin.

* * * * *